US011570330B2

(12) United States Patent
Suda

(10) Patent No.: US 11,570,330 B2
(45) Date of Patent: Jan. 31, 2023

(54) IMAGE PROCESSING APPARATUS AND CONTROL METHOD FOR IMAGE PROCESSING APPARATUS FOR ERROR REDUCTION

(71) Applicant: SEIKO EPSON CORPORATION, Tokyo (JP)

(72) Inventor: Masayuki Suda, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 17/207,155

(22) Filed: Mar. 19, 2021

(65) Prior Publication Data
US 2021/0306514 A1 Sep. 30, 2021

(30) Foreign Application Priority Data
Mar. 25, 2020 (JP) .............................. JP2020-054143

(51) Int. Cl.
*H04N 1/32* (2006.01)
*G06F 3/12* (2006.01)
*G06F 11/07* (2006.01)
*G06F 11/00* (2006.01)

(52) U.S. Cl.
CPC ......... *H04N 1/32667* (2013.01); *G06F 3/121* (2013.01); *G06F 3/1234* (2013.01); *G06F 3/1259* (2013.01); *H04N 1/32625* (2013.01); *H04N 1/32683* (2013.01); *H04N 1/32694* (2013.01); *G06F 3/1211* (2013.01); *G06F 11/004* (2013.01); *G06F 11/0733* (2013.01); *G06F 11/0793* (2013.01); *H04N 1/32651* (2013.01)

(58) Field of Classification Search
None
See application file for complete search history.

(56) References Cited

U.S. PATENT DOCUMENTS

| 6,662,318 B1 * | 12/2003 | Baysah ............... G06F 11/0781 714/48 |
| 2002/0118383 A1 * | 8/2002 | Kamiya ............... H04N 1/0048 358/1.14 |
| 2005/0179931 A1 | 8/2005 | Yamaguchi et al. |
| 2007/0229877 A1 * | 10/2007 | Shima ................ G06K 15/1822 358/1.14 |
| 2019/0065125 A1 * | 2/2019 | Genda ................... G06F 3/1234 |

FOREIGN PATENT DOCUMENTS

JP 2005229210 A 8/2005

* cited by examiner

*Primary Examiner* — Miya J Williams
(74) *Attorney, Agent, or Firm* — Chip Law Group

(57) ABSTRACT

An image processing apparatus includes a processing section and a control section configured to instruct operation of the processing section. The control section executes, before sending, to the processing section, a first instruction corresponding to an instruction that caused an error in the past, an error avoidance operation based on instruction history information and operation state history information acquired from a storing section that stores the instruction history information and the operation state history information, the instruction history information indicating an instruction given to the processing section by the control section, the operation state history information indicating an operation state of the processing section caused by the instruction.

14 Claims, 6 Drawing Sheets

*FIG. 5*

| NUMBER | BLOCK NAME | OPERATION INSTRUCTION/INSTRUCTION RESULT |
|---|---|---|
| 21 | OPERATION PANEL | SCAN SETTING SCREEN DISPLAY INSTRUCTION |
| 20 | OPERATION PANEL | SUCCESS IN DISPLAY OF SCAN SETTING SCREEN |
| 19 | OPERATION PANEL | DUPLEX SETTING SWITCHING INSTRUCTION |
| 18 | OPERATION PANEL | SUCCESS IN TORQUE BUTTON SWITCHING TO DUPLEX SETTING |
| 17 | INPUT-IMAGE PROCESSING SECTION | DUPLEX SETTING, COLOR, ONE-PART SCAN EXECUTION INSTRUCTION |
| 16 | INPUT-IMAGE PROCESSING SECTION | SCAN FAILURE: NO PAPER |
| 15 | INPUT-IMAGE PROCESSING SECTION | DUPLEX SETTING, COLOR, ONE-PART SCAN EXECUTION INSTRUCTION |
| 14 | INPUT-IMAGE PROCESSING SECTION | SCAN START |
| 13 | OPERATION PANEL | SCREEN DURING SCAN DISPLAY INSTRUCTION |
| 12 | OPERATION PANEL | SUCCESS IN DISPLAY OF SCREEN DURING SCAN |
| 11 | EXTERNAL STORAGE PROCESSING SECTION | SAVING INSTRUCTION FOR SCAN DATA |
| 10 | EXTERNAL STORAGE PROCESSING SECTION | SAVING COMPLETION OF SCAN DATA |
| 9 | OPERATION PANEL | SCAN COMPLETION SCREEN DISPLAY INSTRUCTION |
| 8 | OPERATION PANEL | SUCCESS IN DISPLAY OF SCAN COMPLETION SCREEN |
| 7 | INPUT-IMAGE PROCESSING SECTION | DUPLEX SETTING, MONOCHROME, TWO-PART SCAN EXECUTION INSTRUCTION |
| 6 | INPUT-IMAGE PROCESSING SECTION | SCAN START |
| 5 | OPERATION PANEL | SCREEN DURING SCAN DISPLAY INSTRUCTION |
| 4 | OPERATION PANEL | SUCCESS IN DISPLAY OF SCREEN DURING SCAN |
| 3 | OPERATION PANEL | SCREEN DURING CANCELLATION DISPLAY INSTRUCTION |
| 2 | OPERATION PANEL | SUCCESS IN DISPLAY OF SCREEN DURING CANCELLATION |
| 1 | INPUT-IMAGE PROCESSING SECTION | SCAN CANCELLATION EXECUTION |
| 0 | INPUT-IMAGE PROCESSING SECTION | SCAN ERROR: ERROR CODE XXXX |

IMAGE PROCESSING APPARATUS AND CONTROL METHOD FOR IMAGE PROCESSING APPARATUS FOR ERROR REDUCTION

The present application is based on, and claims priority from JP Application Serial Number 2020-054143, filed Mar. 25, 2020, the disclosure of which is hereby incorporated by reference herein in its entirety.

BACKGROUND

1. Technical Field

The present disclosure relates to an image processing apparatus and a control method for the image processing apparatus.

2. Related Art

JP-A-2005-229210 (Patent Literature 1) describes a technique for, in a copy machine or the like, automatically performing a reboot when a reboot target failure among failures likely to be restored by ON/OFF of a power supply is detected.

However, in the technique described in Patent Literature 1, the reboot for recovery is performed after an error occurs. However, the occurrence of the error cannot be prevented.

SUMMARY

An aspect is directed to an image processing apparatus including a processing section and a control section configured to instruct operation of the processing section. The control section executes, before sending, to the processing section, a first instruction corresponding to an instruction that caused an error in past, an error avoidance operation based on instruction history information and operation state history information acquired from a storing section that stores the instruction history information and the operation state history information, the instruction history information indicating an instruction given to the processing section by the control section, the operation state history information indicating an operation state of the processing section caused by the instruction.

Another aspect is directed to a control method for an image processing apparatus including a processing section and a control section configured to instruct operation of the processing section, the method including causing the control section to execute, before sending, to the processing section, a first instruction corresponding to an instruction that caused an error in past, an error avoidance operation based on instruction history information and operation state history information acquired from a storing section that stores the instruction history information and the operation state history information, the instruction history information indicating an instruction given to the processing section by the control section, the operation state history information indicating an operation state of the processing section caused by the instruction.

BRIEF DESCRIPTION OF THE DRAWINGS

FIG. 5 is a diagram showing an example of information included in the history information according to the embodiment.

DESCRIPTION OF EXEMPLARY EMBODIMENTS

An embodiment is explained below with reference to the drawings.

Figure 1:
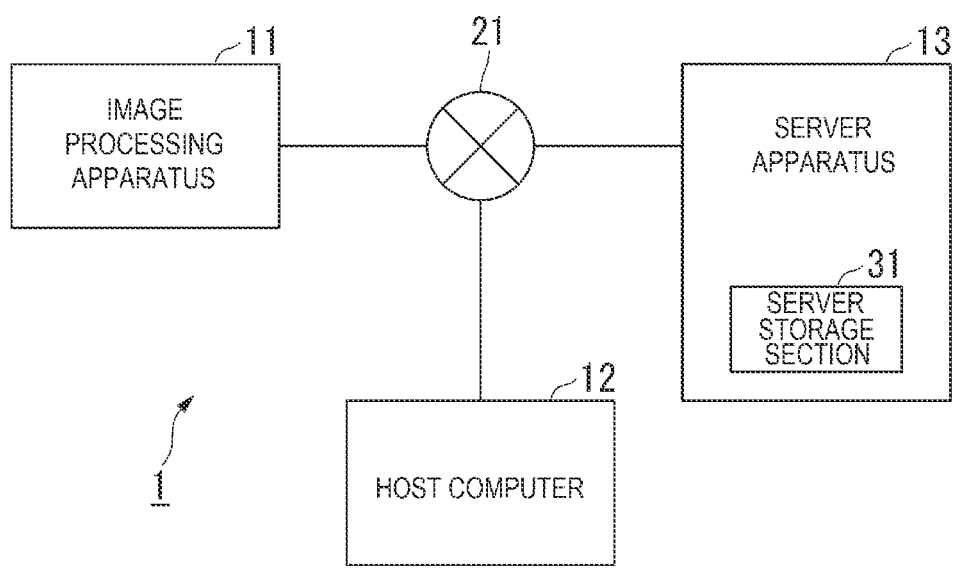
FIG. 1 is a diagram showing a schematic configuration of an image processing system according to an embodiment.

FIG. 1 is a diagram showing a schematic configuration of an image processing system 1 according to the embodiment.

The image processing system 1 includes an image processing apparatus 11, a host computer 12, a server apparatus 13, and a line 21.

The image processing apparatus 11, the host computer 12, and the server apparatus 13 are respectively communicably connected via the line 21.

For example, the line 21 may be a wired line, may be a wireless line, or a line including both of the wired line and the wireless line.

In this embodiment, the image processing apparatus 11 is a multifunction peripheral.

The image processing apparatus 11 includes a function of a printer that prints an image on a printing medium and a function of a scanner that reads an image. The image processing apparatus 11 may further include other image processing functions.

As another configuration example, the image processing apparatus 11 maybe an apparatus including a single image processing function like a printer, a scanner, a projector, a camera, or the like.

The host computer 12 is capable of controlling the image processing apparatus 11.

When the image processing apparatus 11 independently operates without being controlled by the host computer 12, the host computer 12 may not be included in the image processing system 1.

The server apparatus 13 includes a server storage section 31 that stores information.

The server apparatus 13 is capable of storing, in the server storage section 31, information to be used for processing performed in the image processing apparatus 11, information concerning a result of the processing, and the like. For example, the server apparatus 13 stores, in the server storage section 31, information transmitted from the image processing apparatus 11 to the server apparatus 13, reads out, from the server storage section 31, information corresponding to an instruction transmitted from the image processing apparatus 11 to the server apparatus 13, and transmits the information to the image processing apparatus 11.

When the image processing apparatus 11 operates without exchanging information with the server apparatus 13, the server apparatus 13 may not be included in the image processing system 1.

In this embodiment, the communication between the host computer 12 and the server apparatus 13 may not be performed. Accordingly, in this embodiment, a line connecting the image processing apparatus 11 and the host computer 12 and a line connecting the image processing apparatus 11 and the server apparatus 13 may be different.

In this embodiment, for convenience of explanation, the image processing system 1 including the image processing apparatus 11, the host computer 12, and the server apparatus 13 is explained. However, as another configuration example, a configuration in which the image processing apparatus 11 operates alone may be used. That is, the image processing apparatus 11 may include a storing section that stores information to be used for processing performed in the image processing apparatus 11, information concerning a result of the processing, and the like. In this configuration, the image processing apparatus 11 operates without being controlled by the host computer 12 and operates without exchanging information with the server apparatus 13.

Figure 2:
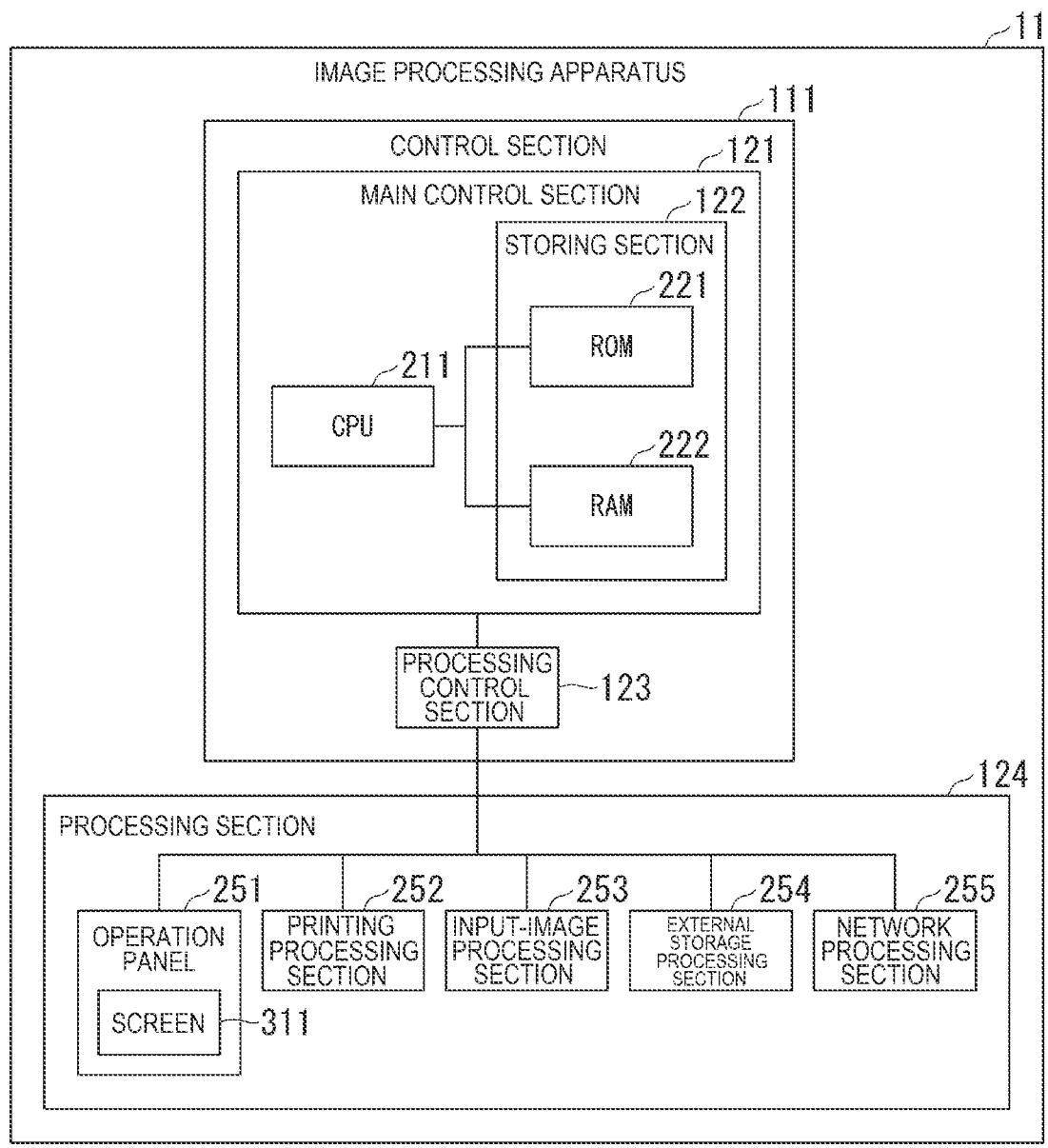
FIG. 2 is a diagram showing a schematic configuration of an image processing apparatus according to the embodiment.

FIG. 2 is a diagram showing a schematic configuration of the image processing apparatus 11 according to the embodiment.

The image processing apparatus 11 includes a control section 111 and a processing section 124.

The control section 111 includes a main control section 121 and a processing control section 123.

The main control section 121 includes a CPU (Central Processing Unit) 211 and a storing section 122.

The storing section 122 includes a ROM (Read Only Memory) 221 and a RAM (Random Access Memory) 222.

The processing section 124 includes an operation panel 251, a printing processing section 252, an input-image processing section 253, an external storage processing section 254, and a network processing section 255.

The operation panel 251 includes a screen 311.

Functional blocks shown in FIG. 2 are examples and are not always limited to an example shown in FIG. 2.

For example, the distinctions of the control section 111, the main control section 121, the processing control section 123, and the like are respectively for convenience of explanation and are not limited to the example shown in FIG. 2.

In the example shown in FIG. 2, a configuration example is shown in which the storing section 122 is included in the main control section 121. However, as another configuration example, the storing section 122 may be provided, for example, on the outside of the main control section 121 in the control section 111 or may be provided on the outside of the control section 111.

The main control section 121 performs various kinds of control. In this embodiment, for example, the main control section 121 instructs the operation of the processing section 124 via the processing control section 123.

The storing section 122 stores various kinds of information in the ROM 221 or the RAM 222.

In this embodiment, the CPU 211 develops a control program stored in the ROM 221 to the RAM 222 and executes the control program to perform various kinds of control. Information concerning parameters to be used during the execution of the control program may be stored in the ROM 221 or the RAM 222.

In this embodiment, for example, information that should be retained even if a power supply of the image processing apparatus 11 is turned off is stored in the ROM 221. Information to be temporarily used by the CPU 211 is stored in the RAM 222. However, the configuration of the storing section 122 may be various. A way of specifying the storing section 122 may also be various.

The processing control section 123 is an interface between the main control section 121 and the processing section 124.

Specifically, the main control section 121 performs, via the processing control section 123, control for sending instructions to the processing blocks included in the processing section 124. The main control section 121 is capable of receiving, via the processing control section 123, information from the processing blocks included in the processing section 124. In this embodiment, the processing blocks included in the processing section 124 are respectively the operation panel 251, the printing processing section 252, the input-image processing section 253, the external storage processing section 254, and the network processing section 255.

In this embodiment, the processing control section 123 has a function of assisting the main control section 121. In this embodiment, the processing control section 123 is controlled by the main control section 121 to be capable of performing various operations concerning the processing section 124.

In the example shown in FIG. 2, for example, a part of functions of the main control section 121 may be grasped as being separated as the processing control section 123.

In this embodiment, the processing control section 123 is provided between the main control section 121 and the processing section 124. However, as another configuration example, functions of the processing control section 123 may be integrated with the main control section 121. In this case, in the image processing apparatus 11, the main control section 121 and the processing section 124 are directly connected and the processing control section 123 is not provided.

However, the main control section 121 and the processing control section 123 may be grasped as separate functional sections. In this case, for example, functions for performing various kinds of control can be grasped as being provided to be distributed to the main control section 121 and the processing control section 123.

The operation panel 251 includes an operation section operated by a user. The operation panel 251 receives content of operation performed by the user and sends the content of the operation to the control section 111.

In this embodiment, the operation section is an operation section of a touch panel displayed on the screen 311. As another configuration example, the operation section may be a physical operation section such as buttons or switches.

The operation panel 251 displays, on the screen 311, information sent from the control section 111 to the operation panel 251.

The printing processing section 252 performs processing for printing an image on a printing medium. The printing medium is, for example, paper.

The input-image processing section 253 performs processing for reading an image of a document or the like. In this embodiment, the input-image processing section 253 performs scan processing for causing a not-shown scanner section to read a reading target document, image processing for read image information, and the like.

The external storage processing section 254 performs processing for exchanging information with an external storage medium. The external storage medium may be any storage medium and may be, for example, a USB (Universal Serial Bus) storage medium.

The network processing section 255 performs processing of communication in which an external network is used. In this embodiment, the network processing section 255 performs communication with the host computer 12 via the line 21. In this embodiment, the network processing section 255 performs communication with the server apparatus 13 via the line 21.

As instructions to the processing blocks included in the processing section 124 and results of the instructions, which are results of operations performed in the processing blocks according to the instructions, various kinds of information may be used.

Examples of an instruction to the operation panel 251 include an instruction to display various screens such as a home screen. Examples of a result of such an instruction include completion or failure of display of the instructed screens.

Examples of an instruction to the printing processing section 252 include an instruction for printing including designation of paper such as A4 plain paper and designation of the number of prints such as one. Examples of a result of such an instruction include completion or failure of the instructed printing.

Examples of an instruction to the input-image processing section 253 include an instruction to start scanning including designation of paper such as A3 plain paper and designation of a form such as simplex/duplex. Examples of a result of such an instruction include completion or failure of the designated scanning.

Examples of an instruction to the external storage processing section 254 include an instruction to save information in an external storage medium. Examples of a result of such an instruction include completion or failure of the instructed saving.

Examples of an instruction to the network processing section 255 include an instruction to perform communication via a network. Examples of a result of such an instruction include completion or failure of the instructed communication.

Figure 3:
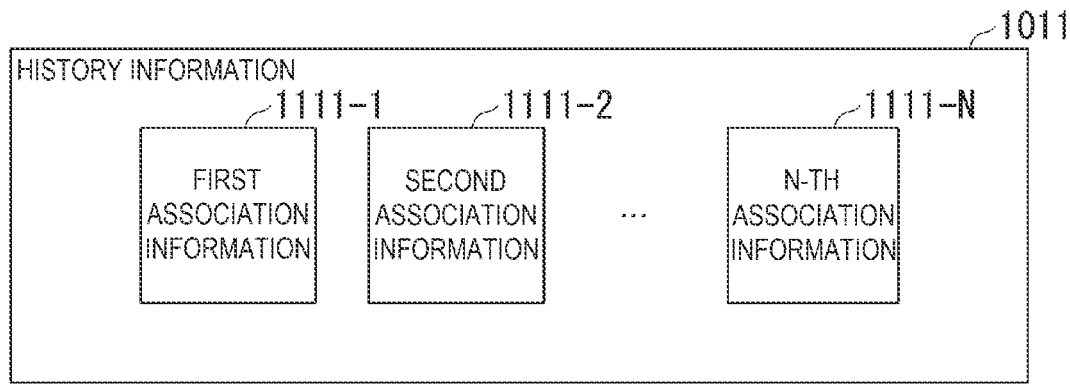
FIG. 3 is a diagram showing a schematic configuration of history information according to the embodiment.

FIG. 3 is a diagram showing a schematic configuration of history information 1011 according to the embodiment.

The history information 1011 is information of a history concerning errors that occurred in the past in the image processing apparatus 11.

The history information 1011 includes first association information 1111-1, second association information 1111-2, . . . , and N-th association information 1111-N. N represents an integer equal to or larger than 1. In an example shown in FIG. 3, N represents an integer equal to or larger than 3.

In this embodiment, the first association information 1111-1, the second association information 1111-2, . . . , and the N-th association information 1111-N are respectively information concerning different errors that occurred in the past. For example, the different errors may be errors of different types or may be errors that occurred at different times irrespective of whether types of the errors are the same or different.

The first association information 1111-1, the second association information 1111-2, . . . , and the N-th association information 1111-N respectively include information concerning the same items. Therefore, the information concerning the same items are collectively explained.

Figure 4:
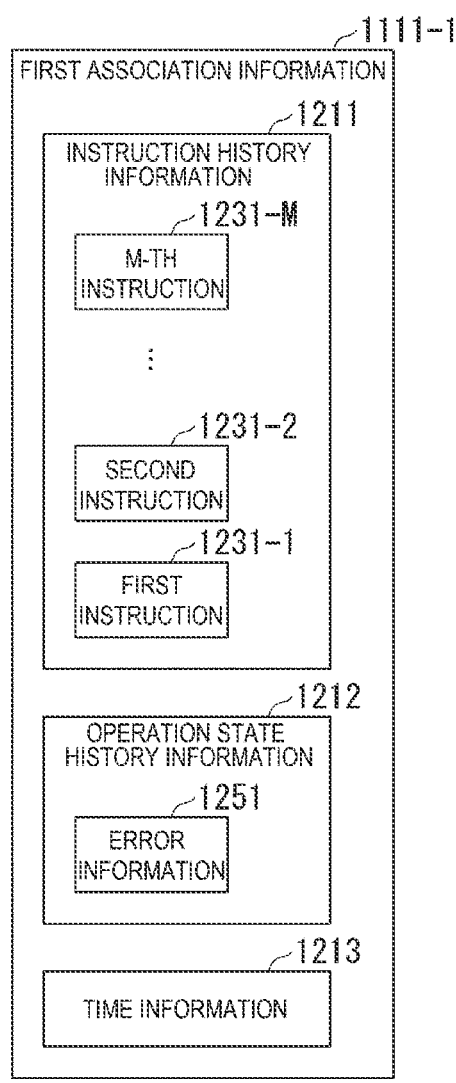
FIG. 4 is a diagram showing a schematic configuration of first association information according to the embodiment.

FIG. 4 is a diagrams showing a schematic configuration of the first association information 1111-1 according to the embodiment.

The first association information 1111-1 includes instruction history information 1211, operation state history information 1212, and time information 1213.

In an example shown in FIG. 4, for convenience of explanation, the instruction history information 1211, the operation state history information 1212, and the time information 1213 are distinguished and explained. However, these kinds of information may be included in association information without being distinguished.

The instruction history information 1211 includes a first instruction 1231-1, a second instruction 1231-2, . . . , and an M-th instruction 1231-M. M represents an integer equal to or larger than 1. In the example shown in FIG. 4, M represents an integer equal to or larger than 3.

In the example shown in FIG. 4, the first instruction 1231-1, the second instruction 1231-2, . . . , and the M-th instruction 1231-M represent instructions in time series from the present to the past. That is, the instruction history information 1211 stores information indicating that, in the order of the M-th instruction 1231-M, an M−1-th instruction, . . . , the second instruction 1231-2, and the first instruction 1231-1, the control section 111 sent, with the processing control section 123, the instructions to processing blocks corresponding to the instructions.

The respective instructions include one or more kinds of information among, for example, content of operation performed by the user and a command generated concerning control of the processing section 124.

The operation state history information 1212 represents a state of operation that occurred in a processing block corresponding to an instruction included in the instruction history information 1211 because the instruction was sent to the processing block from the control section 111.

In this embodiment, the operation state history information 1212 includes error information 1251. That is, in this embodiment, the instruction history information 1211 including occurrence of an error is focused.

The time information 1213 includes information concerning times when instructions included in the instruction history information 1211 were generated and information concerning times when operation states included in the operation state history information 1212 occurred.

As another configuration example, the time information 1213 may include one of the information concerning the times when the instructions included in the instruction history information 1211 were generated and the information concerning the times when the operation states included in the operation state history information 1212 occurred and may not include the other.

When the time information 1213 is not used in the image processing apparatus 11 and the like, the time information 1213 may not be included in the first association information 1111-1.

Each of the second association information 1111-2, . . . , and the N-th association information 1111-N includes information concerning the same items as the items of the first association information 1111-1 and includes information in which contents of instructions, contents of operation states, and times can be different.

In this embodiment, the first association information 1111-1, the second association information 1111-2, . . . , and the N-th association information 1111-N are respectively information at the time when errors occurred. However, as another configuration example, association information at the time when errors did not occur may be included in the history information 1011 together with the first association information 1111-1, the second association information 1111-2, . . . , and the N-th association information 1111-N. In this case, the association information at the time when errors did not occur may include, for example, information concerning the same items as the items of the first association information 1111-1 except that error information is absent.

FIG. 5 is a diagram showing an example of information included in the history information according to the embodiment.

In the example shown in FIG. 5, as the information included in the history information, an example of time-series information 2111 and association information 2121 is shown. In the example shown in FIG. 5, for convenience of explanation, the time-series information 2111 including the association information 2121 is included in the history information. However, for example, information of a portion excluding the association information 2121 in the time-series information 2111 may be excluded from the history information when it is unnecessary to retain the information as the history information. In the example shown in FIG. 5, for convenience of explanation, the time-series information 2111 and the association information 2121 are collectively shown. However, as another configuration example, the time-series information 2111 and the association information 2121 may be separately stored and managed.

In the example shown in FIG. 5, the time-series information 2111 is indicated by a combination of, a number, a block name, which is a name of a processing block, and an operation instruction/an instruction result.

In the example shown in FIG. 5, the association information 2121 is a part of the time-series information 2111.

In this embodiment, for convenience of explanation, a combination of a plurality of instructions included in a time-series manner like the time-series information 2111 and the association information 2121 is referred to as a pattern of instructions as well.

The number represents time-series order in the time-series information 2111.

In the example shown in FIG. 5, a smaller number is closer to the present and a larger number is further in the past. Specifically, in the example shown in FIG. 5, a number 0 to a number 21 are in the direction from the present to the past.

In this embodiment, for convenience of explanation, information concerning the number is shown. However, for example, the information concerning the number may not be included in the time-series information 2111. The order of the combination of the block name and the operation instruction/the instruction result only has to be able to be grasped.

The block name represents a name of a processing block to which an instruction is sent from the control section 111.

In the example shown in FIG. 5, an "operation panel" represents a name of the operation panel 251, an "input-image processing section" represents a name of the input-image processing section 253, and an "external storage processing section" represents a name of the external storage processing section 254.

As another example, a "printing processing section" represents a name of the printing processing section 252 and a "network processing section" represents a name of the network processing section 255.

In this embodiment, the processing blocks are specified by names of the processing blocks. However, as another configuration example, other information capable of specifying the processing blocks may be used instead of the names of the processing blocks. The other information may be, for example, identification information for identifying the processing blocks.

The operation instruction/the instruction result represents an operation instruction, which is an instruction sent from the control section 111 to a processing block corresponding to the instruction, or an instruction result, which is a result of an operation state caused by the instruction.

The example shown in FIG. 5 is more specifically explained.

In a number 21, the control section 111 sent an instruction of a "scan setting screen display instruction" to the operation panel 251. Consequently, in a number 20, an operation state of "success in display of a scan setting screen" occurred in the operation panel 251.

In a number 19, the control section 111 sent an instruction of a "duplex setting switching instruction" to the operation panel 251. Consequently, in a number 18, an operation state of "success in toggle button switching to duplex setting" occurred in the operation panel 251.

In a number 17, the control section 111 sent an instruction of "duplex setting, color, one-part scan execution instruction" to the input-image processing section 253. Consequently, in a number 16, an operation state of "scan failure: no paper" occurred in the input-image processing section 253.

In a number 15, the control section 111 sent an instruction of a "duplex setting, color, one-part scan execution instruction" to the input-image processing section 253. Consequently, in a number 14, an operation state of "scan start" occurred in the input-image processing section 253.

In a number 13, the control section 111 sent an instruction of a "screen during scan display instruction" to the operation panel 251. Consequently, in a number 12, an operation state of "success in display of a screen during scan" occurred in the operation panel 251.

In a number 11, the control section 111 sent an instruction of a "saving instruction for scan data" to the external storage processing section 254. Consequently, in a number 10, an operation state of "saving completion of scan data" occurred in the external storage processing section 254.

In a number 9, the control section 111 sent an instruction of a "scan completion screen display instruction" to the operation panel 251. Consequently, in a number 8, an operation state of "success in display of a scan completion screen" occurred in the operation panel 251.

In a number 7, the control section 111 sent an instruction of a "duplex setting, monochrome, two-parts scan execution instruction" to the input-image processing section 253. Consequently, in a number 6, an operation state of "scan start" occurred in the input-image processing section 253.

In a number 5, the control section 111 sent an instruction of a "screen during scan display instruction" to the operation panel 251. Consequently, in a number 4, an operation state of "success in display of a screen during scan" occurred in the operation panel 251.

In a number 3, the control section 111 sent an instruction of a "screen during cancellation display instruction" to the operation panel 251. Consequently, in a number 2, an operation state of "success in display of a screen during cancellation" occurred in the operation panel 251.

In a number 1, an operation state of "scan cancellation execution" occurred in the input-image processing section 253.

In a number 0, an operation state of "scan error; error code XXXX" occurred in the input-image processing section 253.

The "scan error: error code XXXX" indicates that an error occurred in scanning and indicates that a type of the error is specified by the error code XXXX.

In general, a scan error occurs because of access violation or a failure in a mechanical operation.

In the example shown in FIG. 5, in a place where an instruction to a certain processing block and an operation state of the processing block that occurs according to the instruction are continuous, an operation instruction to a processing block corresponding to the instruction occurs in a field of a certain number and an instruction result occurs in the processing block according to the instruction in a field of a number smaller than the number by one.

In the example shown in FIG. 5, a portion corresponding to the number 0 to the number 11 is the association information 2121. The association information 2121 is used as information at the time when errors in fields of the number 1 and the number 0 occur.

In the example shown in FIG. 5, information concerning continuous ten operation instructions/instruction results and ten block names before occurrence of errors is included in the association information 2121. That is, information in the numbers 0 to 1 corresponding to the occurrence of the errors and information in the ten continuous numbers 2 to 11 before the numbers 0 to 1 are included in the association information 2121.

The time-series information 2111 and the association information 2121 shown in FIG. 5 are specific examples. Instructions from the control section 111 to the processing blocks, operation states of the processing blocks that occur according to the instructions, occurrence of errors, and the like may be represented by information in various forms. The numbering, the way of counting the number of fields, and the like in FIG. 5 are also specific examples. Various forms maybe used for the numbering, the way of counting the number of fields, and the like.

In the example shown in FIG. 5, the information concerning the block names and operation instructions included in the association information 2121 is equivalent to the information concerning the instructions included in the instruction history information 1211 in the example shown in FIG. 4.

In the example shown in FIG. 5, the information concerning the block names and the instruction results included in the association information 2121 is equivalent to the information concerning the operation states included in the operation state history information 1212 in the example shown in FIG. 4.

In the example shown in FIG. 5, the information corresponding to the occurrence of the errors included in the association information 2121 is equivalent to the error information 1251 included in the operation state history information 1212 in the example shown in FIG. 4.

In the example shown in FIG. 5, the information concerning the numbers included in the association information 2121 is equivalent to the information concerning the times included in the time information 1213 in the example shown in FIG. 4.

In the example shown in FIG. 4, the information concerning the time-series order is used as the information concerning the times. However, as another configuration example, information such as year, day, hour, minute, and second may be used.

Operation performed in the image processing apparatus 11 according to this embodiment is explained.

In this embodiment, it is assumed that an error is a system error.

The processing control section 123 is controlled by the main control section 121 to output, to the processing block, an instruction of operation to a target processing block included in the processing section 124.

The processing block receives an input of the instruction output from the processing control section 123 and performs operation according to the instruction. The processing block outputs a result of the operation to the processing control section 123.

The processing control section 123 receives an input of the result of the operation output from the processing block. The processing control section 123 stores, in the RAM 222, content of the instruction output to the processing block and a result of the instruction input from the processing block.

Such operation is performed every time the processing control section 123 sends various instructions to the processing section 124. Consequently, contents of instructions sent from the processing control section 123 to the processing section 124 and results of the instructions are accumulated in the RAM 222. In this embodiment, the information accumulated in this way is information like the time-series information 2111 shown in FIG. 5.

In the image processing apparatus 11, when detecting that an error occurs, the processing control section 123 reads out the information accumulated in the RAM 222 and stores the read-out information in the ROM 221. The information is accumulated in the ROM 221 as association information for associating contents of a predetermined number of instructions immediately before the error occurs and results of the instructions.

The processing control section 123 includes, in one association information, contents of instructions in a predetermined number of steps before an error occurs and results of the instructions and stores the contents of the instructions and the results of the instructions in the ROM 221.

In the example shown in FIG. 5, the processing control section 123 includes, in one association information 2121, contents of instructions in ten steps before an error occurs in the input-image processing section 253 and results of the instruction and stores the contents of the instructions and the results of the instructions in the ROM 221.

The association information 2121 in the example shown in FIG. 5 represents an accumulation range at the time when an error occurs when scanning is cancelled during the scanning.

Every time various errors occur, the processing control section 123 accumulates association information corresponding to the errors in the ROM 221. Consequently, the history information 1011 shown in FIG. 3 is accumulated in the ROM 221.

In the image processing apparatus 11, during a start of the control section 111, the main control section 121 reads out association information accumulated in the ROM 221 and develops the association information in the RAM 222.

When outputting an instruction to the processing section 124, the processing control section 123 successively compares content of the time-series instruction and content of a time-series instruction included in the association information developed in the RAM 222. When patterns of the same instructions as patterns of a predetermined number of time-series instructions among a time-series plurality of instructions at the time when an error occurred in the past occur, the processing control section 123 instructs, based on the association information developed in the RAM 222, a processing block operating immediately before the error occurred to execute a predetermined error avoiding operation.

Consequently, the processing block executes the error avoiding operation. Thereafter, the processing control section 123 outputs a subsequent instruction of the time-series plurality of instructions to a processing block corresponding to the instruction. In this case, when an error is avoided by the error avoiding operation, operation is executed by the processing block according to the subsequent instruction.

In this embodiment, when successively comparing the content of the time-series instruction sent by the processing control section 123 and the content of the time-series instruction included in the association information developed in the RAM 222, the processing control section 123 may determine, for example, whether the content of the instruction coincides and whether a situation of the result of the instruction coincides.

That is, when the same situations as a predetermined number of time-series situations in a time-series plurality of instructions and results of the instructions at the time when an error occurred in the past occur, the processing control section 123 may instruct, based on the association information developed in the RAM 222, a processing block operating immediately before the error occurred to execute a predetermined error avoiding operation.

The association information 2121 shown in FIG. 5 is explained as an example.

The association information 2121 includes contents often instructions and results of the instructions immediately before an error occurs. For example, it is assumed that, as a condition for executing an error avoiding operation, a condition that the same situations as maximum nine situations in the contents of the ten instructions and the results of the instructions occur is used. That is, the condition is a condition that 9/10 situations coincide. In this case, when determining that the same situations as nine steps from the number 11 to the number 3 among situations in ten steps from the number 11 to the number 2 shown in FIG. 5 occur, the processing control section 123 instructs the input-image processing section 253, which is a processing block operating immediately before the last error, to execute the error avoiding operation.

As the error avoiding operation, for example, a plurality of types of error avoiding operations may be used.

For example, when a type of an error avoiding operation effective for an occurred situation is stored in the ROM 221 or the RAM 222, the processing control section 123 instructs a processing block corresponding to the situation to execute the error avoiding operation.

On the other hand, for example, when a type of an error avoiding operation effective for an occurred situation is not stored in the ROM 221 or the RAM 222, the processing control section 123 may instruct a processing block corresponding to the situation to execute one or more error avoiding operations on a trial basis.

As an example, when a type of an error avoiding operation effective for an occurred situation is unknown, the processing control section 123 may instruct a processing block corresponding to the situation to execute a type of an error avoiding operation selected at random on a trial basis.

As another example, when information deciding order of trying one or more error avoiding operations for an occurred situation is stored in the ROM 221 or the RAM 222, the processing control section 123 may instruct a processing block corresponding to the situation to execute a selected type of an error avoiding operation according to the order on a trial basis. The order may be called priority order or the like. The order may be decided according to, for example, a type of an occurred error.

The priority order of the error avoiding operations may be managed using weighing applied to the respective error avoiding operations, for example, the priority order is higher as values of the weighting are larger.

A specific example of the error avoiding operation is explained. The error avoiding operation is executed on, for example, processing being executed in the processing section 124.

As a first example, the error avoiding operation may be operation for, when the condition for executing the error avoiding operation is satisfied, before sending a subsequent instruction, standing by for a random time and thereafter resuming sending the instruction. The processing control section 123 may determine the random time, for example, using a random number. A fixed time set in advance may be used instead of the random time.

As a second example, the error avoiding operation may be operation for, when the condition for executing the error avoiding operation is satisfied, before sending a subsequent instruction, after internally invoking suspension and resumption processing for a job, resuming sending the instruction. The job is, for example, a job performed when the error avoiding operation is executed.

As a third example, the error avoiding operation may be operation for, when the condition for executing the error avoiding operation is satisfied, before sending a subsequent instruction, internally transitioning a screen and returning to a master screen and, thereafter, resuming sending the instruction. The master screen is a screen immediately before or a screen a predetermined number before a target screen. The master screen for the target screen is, for example, decided in advance. The target screen is, for example, a screen displayed when the error avoiding operation is executed.

As a fourth example, the error avoiding operation may be operation for, when the condition for executing the error avoiding operation is satisfied, before sending a subsequent instruction, rebooting a target processing block and, thereafter, resuming sending the instruction. The target processing block is, for example, a processing block in which occurrence of an error that should be avoided is stored.

The error avoiding operation according to the second example maybe preferentially executed, for example, when processing immediately before an error is performed by the printing processing section 252 or when the processing immediately before an error is performed by the input-image processing section 253. For example, the printing processing section 252 executes a printing jog and the input-image processing section 253 executes a scan job.

The error avoiding operation according to the third example may be preferentially executed, for example, when the processing immediately before an error is performed by the operation panel 251.

The error avoiding operation according to the fourth example may be executed, for example, when error avoidance is not realized in execution of at least one of the error avoiding operation according to the first example, the error avoiding operation according to the second example, and the error avoiding operation according to the third example.

As a specific example, for example, the error avoiding operation according to the second example, the error avoiding operation according to the first example, and the error avoiding operation according to the fourth example may be executed in this order as the error avoiding operation concerning cancellation of scanning performed by the input-image processing section 253.

As a specific example, for example, the error avoiding operation relating to the third example and the error avoiding operation according to the fourth example may be executed in this order as the error avoiding operation concerning the operation panel 251.

As explained above, in the image processing apparatus 11 according to this embodiment, the storing section 122 stores the instruction history information indicating an instruction given to the processing section 124 from the processing control section 123 and the operation state history information indicating an operation state of the processing section 124 caused by the instruction. Before sending a first instruction corresponding to an instruction that caused an error in the past to the processing section 124, the processing control section 123 executes the error avoiding operation based on the instruction history information and the operation state history information acquired from the storing section 122. As the first instruction, for example, an instruction in predetermined order among time-series instructions included in the instruction history information is used.

In the image processing apparatus 11 according to this embodiment, when a second instruction and the first instruction sequentially sent from the processing control section 123 to the processing section 124 are included in the instruction history information and information indicating that an error occurs when the second instruction and the first instruction are sequentially sent from the processing control section 123 to the processing section 124 is included in the operation state history information, after sending the second instruction to the processing section 124, the processing control section 123 executes the error avoiding operation before sending the first instruction to the processing section 124. The second instruction may be, for example, an instruction temporally immediately before the first instruction or may be an instruction temporally two or more before the first instruction.

In the image processing apparatus 11 according to this embodiment, the processing control section 123 is capable of selecting an error avoiding operation to be executed among a plurality of error avoiding operations. In this case, a method of selecting an error avoiding operation to be executed is stored in the ROM 221 or the RAM 222 and is referred to by the processing control section 123.

For example, the processing control section 123 may select, according to a type of an error, an error avoiding operation to be executed among the plurality of error avoiding operations. In this case, correspondence between the type of the error and the error avoiding operation to be executed is stored in the ROM 221 or the RAM 222 and referred to by the processing control section 123.

For example, an error avoiding operation for standing by for a predetermined time may be used.

For example, an error avoiding operation for performing suspension and resumption of a jot may be used.

For example, an error avoiding operation for performing transition of a screen may be used.

For example, an error avoiding operation for performing a reboot of a predetermined section may be used. In this embodiment, the predetermined section is, for example, a processing block included in the processing section 124.

For example, the number of instructions included in the instruction history information of the association information may be a fixed number or may be a variable number.

The number of instructions included in the instruction history information of the association information may be set or adjusted based on, for example, a total value of the number of instructions and the number of states of operations included in the operation state history information of the association information.

For example, the processing control section 123 may include a predetermined number of instructions in the instruction history information in the initial period and, thereafter, adjust the number of instructions to be included in the instruction history information. In this case, as a form of adjusting the number of instructions to be included in the instruction history information, various forms may be used.

As an example, the processing control section 123 may adjust, according to a situation at the time when an error occurs, the number of instructions to be included in the instruction history information.

As a specific example, the situation at the time when the error occurs may include a result of execution of the error avoiding operation.

For example, when an error is avoided as a result of executing the error avoiding operation, the processing control section 123 may adopt the number of instructions included in instruction history information used at that time. For example, when an error is not avoided as a result of executing the error avoiding operation, the processing control section 123 may change the number of instructions included in instruction history information used at that time to a number larger than the number of instructions.

As a specific example, the situation at the time when the error occurs includes a pattern of an instruction at the time when the error occurs. The processing control section 123 may adjust, based on the numbers of instructions included in patterns of instructions at the time when a plurality of errors respectively occur, the number of instructions to be included in the instruction history information to a maximum value of the numbers of instructions.

For example, when the numbers of instructions to be included in the instruction history information are set to the same number about a plurality of kinds of association information, the processing control section 123 adopts a maximum value of the numbers of instructions in the plurality of kinds of association information.

For example, the processing control section 123 may adjust, based on the number of instructions generated in a predetermined time, the number of instructions to be included in the instruction history information. The predetermined time is stored in, for example, the ROM 221 or the RAM 222. As the predetermined time, for example, a fixed value may be used or a variable value may be used.

The information used in the image processing apparatus 11 is stored in the storing section 122 included in the image processing apparatus 11. However, as another example, a configuration in which a part of the information used in the image processing apparatus 11 is stored in the server storage section 31 of the server apparatus 13 may be used.

In this configuration, the processing control section 123 is controlled by the main control section 121 to control the network processing section 255 and transmit predetermined information to the server apparatus 13 via the line 21. The server apparatus 13 receives the information and stores the information in the server storage section 31.

The processing control section 123 is controlled by the main control section 121 to control the network processing section 255 and transmit a request for information necessary for processing to the server apparatus 13 via the line 21. When receiving the request, the server apparatus 13 reads out information relating to the request from the server storage section 31 and transmits the information to the image processing apparatus 11 via the line 21. Consequently, the main control section 121 acquires the information.

As the predetermined information stored in the server storage section 31, for example, association information including instruction history information and operation state history information may be included. As the predetermined information, for example, history information including a plurality of kinds of association information may be included.

In the server apparatus 13, for example, a database provided on the outside of the server apparatus 13 may be used instead of the server storage section 31.

An example of a procedure of processing for error avoidance performed in the image processing apparatus 11 is explained with reference to FIG. 6.

Figure 6:
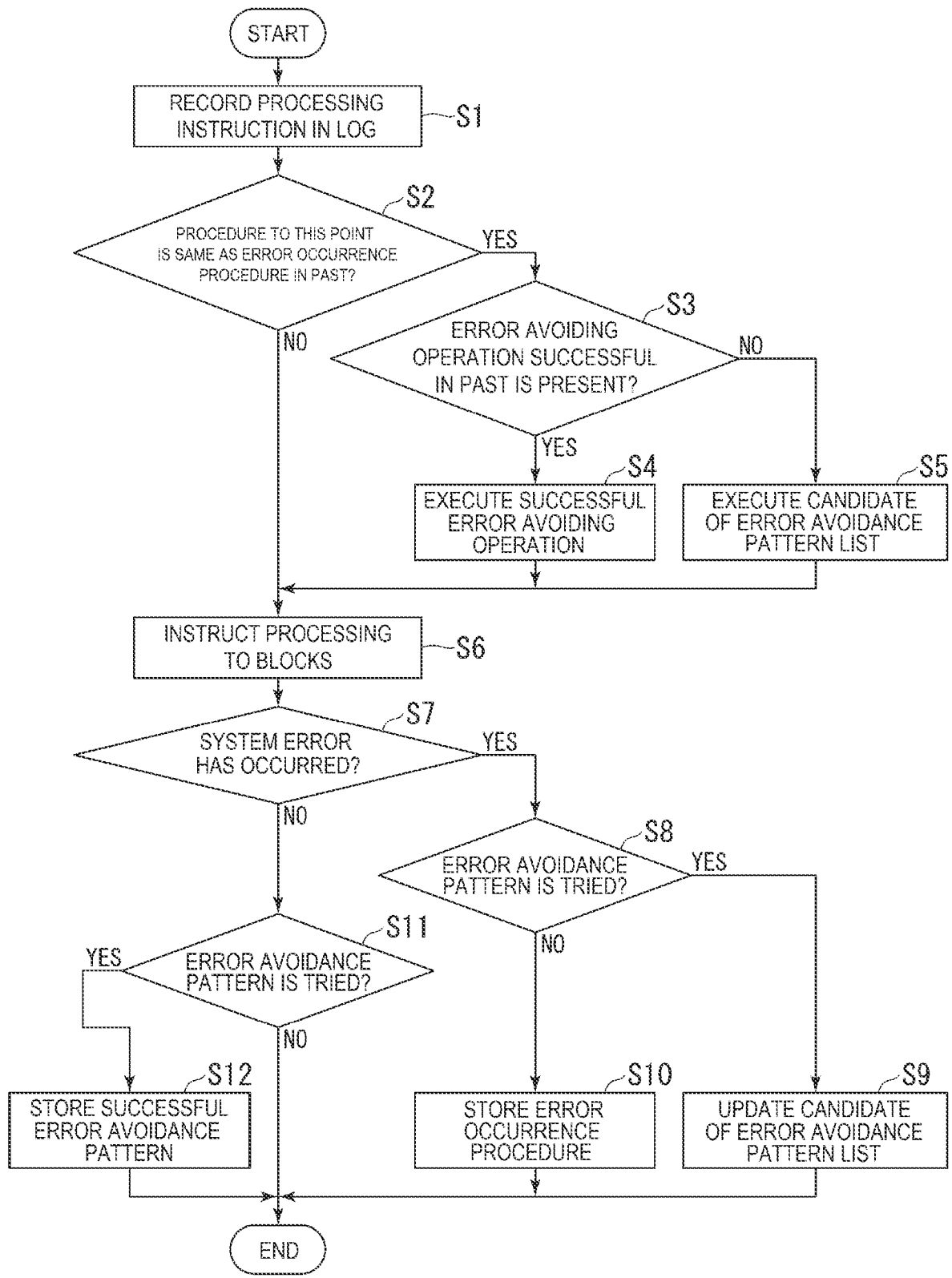
FIG. 6 is a diagram showing an example of a procedure of processing performed in the image processing apparatus according to the embodiment.

FIG. 6 is a diagram showing the example of the procedure of the processing performed in the image processing apparatus 11 according to the embodiment.

In step S1, in the image processing apparatus 11, the processing control section 123 records an instruction to the processing section 124 in a log. The log is time-series information and is stored in, for example, the ROM 221. The processing control section 123 shifts to processing in step S2.

In step S2, in the image processing apparatus 11, the processing control section 123 determines whether a procedure to this point is the same as an error occurrence procedure in the past.

As a result of the determination, in the image processing apparatus 11, when determining that the procedure to this point is the same as the error occurrence procedure in the past, the processing control section 123 determines YES in step S2 and shifts to processing in step S3.

On the other hand, in the image processing apparatus 11, when determining that the procedure to this point is not the same as the error occurrence procedure in the past, the processing control section 123 determines NO in step S2 and shifts to processing in step S6.

In this embodiment, the procedure to this point is equivalent to contents of a predetermined number of instructions and results of the instructions.

In this embodiment, the error occurrence procedure in the past is equivalent to a procedure at the time when an error occurred in the past.

In step S3, in the image processing apparatus 11, the processing control section 123 determines whether an error avoiding operation successful in the past is present about the error occurrence procedure in the past with which the procedure to this point coincides. The error avoiding operation successful in the past is stored in, for example, the ROM 221 and the RAM 222.

As a result of this determination, in the image processing apparatus 11, when determining that an error avoiding operation successful in the past is present about the error occurrence procedure in the past with which the procedure to this point coincides, the processing control section 123 determines YES in step S3 and shifts to processing in step S4.

On the other hand, in the image processing apparatus 11, when determining that an error avoiding operation successful in the past is absent about the error occurrence procedure in the past with which the procedure to this point coincides, the processing control section 123 determines NO in step S3 and shifts to processing in step S5.

In step S4, in the image processing apparatus 11, the processing control section 123 executes the error avoiding operation successful in the past. The processing control section 123 shifts to processing in step S6.

In step S5, in the image processing apparatus 11, the processing control section 123 executes a candidate of an error avoidance pattern list. The processing control section 123 shifts to the processing in step S6.

The error avoidance pattern list is a list of error avoidance patterns. Candidates of one or more error avoiding operations and priority order of the respective error avoiding operations are listed and included in the error avoidance pattern list. The error avoidance pattern list is stored in, for example, the ROM 221.

In step S6, in the image processing apparatus 11, the processing control section 123 outputs an instruction to a processing block of the processing section 124. The processing control section 123 shifts to processing in step S7.

The instruction is a normal instruction when an error avoiding operation is not executed and, when the error avoiding operation is executed, is an instruction reserved for the error avoiding operation.

In step S7, in the image processing apparatus 11, the processing control section 123 determines whether a system error has occurred.

As a result of this determination, in the image processing apparatus 11, when determining that a system error has occurred, the processing control section 123 determines YES in step S7 and shifts to processing in step S8.

On the other hand, in the image processing apparatus 11, when determining that a system error has not occurred, the processing control section 123 determines NO in step S7 and shifts to processing in step S11.

In step S8, in the image processing apparatus 11, the processing control section 123 determines whether an error avoidance pattern is tried.

As a result of this determination, in the image processing apparatus 11, when determining that an error avoidance pattern is tried, the processing control section 123 determines YES in step S8 and shifts to processing in step S9.

On the other hand, in the image processing apparatus 11, when determining that an error avoidance pattern is not tried, the processing control section 123 determines NO in step S8 and shifts to processing in step S10.

In step S9, in the image processing apparatus 11, the processing control section 123 updates, based on a trial result of the error avoidance pattern, the candidates of the error avoiding operations included in the error avoidance pattern list. That is, the processing control section 123 rewrites the error avoidance pattern list such that the error avoidance operation assumed more effective has higher priority order. The processing control section 123 ends the processing of this flow.

In step S10, in the image processing apparatus 11, concerning the occurred error, the processing control section 123 stores an error occurrence procedure in the ROM 221. The processing control section 123 stores, as the error occurrence procedure, association information including instruction history information and operation state history information in the ROM 221. The processing control section 123 ends the processing of this flow.

In step S11, in the image processing apparatus 11, the processing control section 123 determines whether an error avoidance pattern is tried.

As a result of this determination, in the image processing apparatus 11, when determining that an error avoidance pattern is tried, the processing control section 123 determines YES in step S11 and shifts to processing in step S12.

On the other hand, in the image processing apparatus 11, when determining that an error avoidance pattern is not tried, the processing control section 123 determines NO in step S11 and ends the processing of this flow.

In step S12, in the image processing apparatus 11, the processing control section 123 stores a successful error avoidance pattern in the ROM 221 such that the successful error avoidance pattern is used from the next time. The processing control section 123 ends the processing of this flow.

An example of a procedure of processing for adjustment of the number of instructions performed in the image processing apparatus 11 is explained with reference to FIG. 7.

Figure 7:
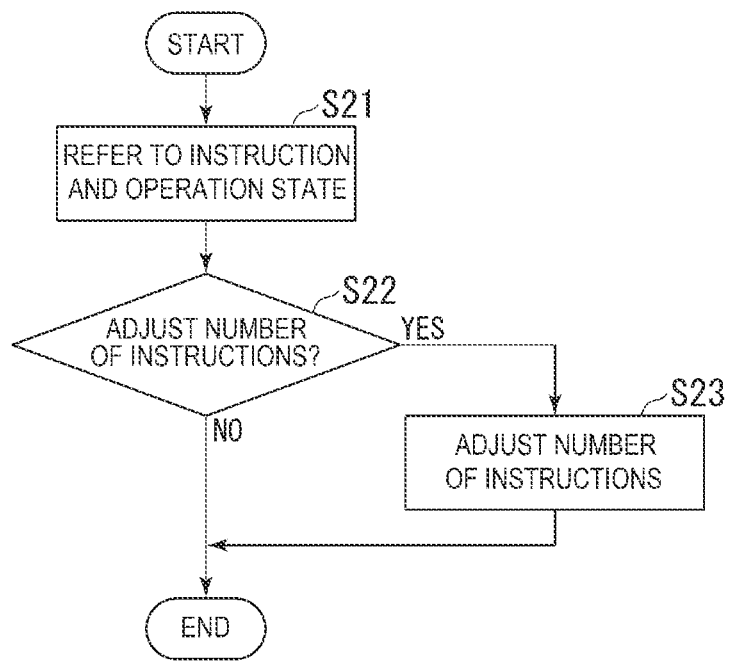
FIG. 7 is a diagram showing an example of a procedure of processing performed in the image processing apparatus according to the embodiment.

FIG. 7 is a diagram showing the example of the procedure of the processing performed in the image processing apparatus 11 according to the embodiment.

For example, processing of a flow shown in FIG. 7 may be performed when the processing of the flow shown in FIG. 6 is completed, maybe performed every time a fixed time elapses, or may be performed at any other timing.

In step S21, in the image processing apparatus 11, the processing control section 123 refers to information concerning an instruction and an operation state based on the association information stored in the ROM 221. The processing control section 123 shifts to processing in step S22.

In step S22, in the image processing apparatus 11, the processing control section 123 determines whether to adjust the number of instructions to be included in the instruction history information.

As a result of this determination, in the image processing apparatus 11, when determining to adjust the number of instructions to be included in the instruction history information, the processing control section 123 determines YES in step S22 and shifts to processing in step S23.

On the other hand, in the image processing apparatus 11, when determining not to adjust the number of instructions to be included in the instruction history information, the processing control section 123 determines NO in step S22 and ends the processing of this flow.

In step S23, in the image processing apparatus 11, the processing control section 123 adjusts the number of instructions to be included in the instruction history information. The processing control section 123 ends the processing of this flow.

For example, when a new error occurs, since instruction history information and operation state history information corresponding to the error are not stored yet, the processing control section 123 stores the instruction history information and the operation state history information corresponding to the error anew.

For example, when an error of the same type as an error in the past occurs and instruction history information and operation state history information corresponding to the error in the past are stored, the processing control section 123 may update, based on a situation or the like of this time, the instruction history information and the operation state history information corresponding to the error in the past already stored.

As another example, for example, when an error of the same type as an error in the past occurs and instruction history information and operation state history information corresponding to the error in the past are stored, the processing control section 123 may store instruction history information and operation state history information corresponding to an error of this time anew. In such a configuration, for example, when pluralities of kinds of instruction history information and operation state history information in the case in which errors of the same type occur are stored, the processing control section 123 may generate one kind of instruction history information and one kind of operation state history information based on these pluralities of kinds of instruction history information and operation state history information. That is, the processing control section 123 may generate, based on these pluralities of kinds of instruction history information and operation state history information, one kind of instruction history information and one kind of operation state history information assumed to be effective.

As a specific example, for example, when pluralities of kinds of instruction history information and operation state history information in the case in which the errors of the same type occur are stored, the processing control section 123 may extract common portions in these pluralities of instruction history information and operation state history information and adopt the common portions as one kind of instruction history information and one kind of operation state history information.

As a specific example, when an error of the same type as an error corresponding to instruction history information and operation state history information already stored occurs but a situation of the error cannot be detected beforehand, the processing control section 123 may perform, about the instruction history information and the operation state history information already stored, control for increasing the number of instructions to be included in the instruction history information.

When determining whether a situation of time-series instructions or the like already stored and a situation occurring this time are the same, for example, the processing control section 123 may regard the situations are the same when determining that the situations are not completely the same but are similar to each other. In such a configuration, information serving as a determination standard for determining whether two situations are similar is stored in the storing section 122. The processing control section 123 performs determination of similarity referring to the information.

The processing control section 123 may learn, for example, by executing machine learning, any information concerning avoidance of an error using the error avoiding operation according to this embodiment.

As explained above, in the image processing apparatus 11 in the image processing system 1 according to this embodiment, a predetermined number of operation procedures by the user and operation states of processing blocks immediately before occurrence of an error are stored. In the image processing apparatus 11, in the same situation as a situation in which an error occurs in the past, an error avoiding operation incorporated in advance is executed.

Therefore, in the image processing apparatus 11, for example, it is possible to automatically prevent occurrence of an error according to a predetermined processing procedure.

For example, in the image processing apparatus 11, when an error avoiding operation in which avoidance of an error was successful in the past is executed, it is possible to avoid an error by preventing a procedure in which an error occurs.

For example, in the image processing apparatus 11, even when effectiveness of an error avoiding operation is unclear, it is possible to improve possibility of error avoidance and suppress occurrence of an error by executing the error avoiding operation on a trial basis. In the image processing apparatus 11, it is possible to update, by accumulating a result of such a trial, the error avoiding operation such that an error avoiding operation more effective for error avoidance is executed.

In the image processing apparatus 11, for example, it is possible to improve accuracy of avoidance of an error by updating a procedure of a time-series instruction, which is a condition for executing the error avoiding operation.

For example, in the related art, for a system error due to a deficiency of software, measures for performing correction of the software and applying the software to target equipment have been taken.

Accordingly, in the related art, an occurrence procedure of an error that occurs during operation by the user has been used only as information for correcting the software.

However, in the related art, phases such as collection of information, an analysis of processing, correction of a deficiency, and provision to the market have needed to be repeated until the software is corrected and provided to the market. Therefore, a lot of time has been sometimes required.

In this way, in the related art, a lot of time has been sometimes required from occurrence of a system error until release of a revised version of the software in the market.

Therefore, in the image processing apparatus 11 according to this embodiment, for example, an occurrence procedure during error occurrence in the past is stored and, thereafter, when the same procedure as a predetermined portion in the occurrence procedure is performed by the user, the error avoiding operation is executed.

Consequently, in the image processing apparatus 11 according to this embodiment, for example, it is possible to execute the error avoiding operation even if the software is not corrected. In the image processing apparatus 11 according to this embodiment, for example, compared with the related art, in a user environment, it is possible to reduce a time in which the user cannot use the image processing apparatus 11 because of a system error. Such a time may be called, for example, downtime or the like.

In a configuration in which the image processing apparatus 11 is connected to the server apparatus 13 via the line 21 as in this embodiment, for example, the image processing apparatus 11 can share various kinds of information with other image processing apparatuses and the like connected to the line 21 via the server apparatus 13 and the like. For example, the image processing apparatus 11 can more efficiently share information for specifying a satisfactory error avoiding operation by sharing, with the other image processing apparatus, instruction history information and operation state history information in the case in which an error occurs. In such a configuration, in the image processing apparatus 11, it is possible to acquire information concerning errors that occur in the other image processing apparatuses. Consequently, it is possible to improve an effect of error avoidance in a plurality of image processing apparatuses.

As a configuration example, the image processing apparatus 11 includes the processing section 124 and the control section 111 that instructs the operation of the processing section 124.

The control section 111 executes, before sending, to the processing section 124, a first instruction corresponding to an instruction that caused an error in the past, an error avoiding operation based on instruction history information and operation state history information acquired from the storing section that stores the instruction history information and the operation state history information. The instruction history information indicates an instruction given to the processing section 124 by the control section 111 and the operation state history information indicates an operation state of the processing section 124 caused by the instruction.

Therefore, in the image processing apparatus 11, it is possible to prevent occurrence of an error.

As a configuration example, in the image processing apparatus 11, when an instruction corresponding to a second instruction and an instruction corresponding to the first instruction sequentially sent from the control section 111 to the processing section 124 are included in the instruction history information and information indicating that an error occurs when the instruction corresponding to the second instruction and the instruction corresponding to the first instruction are sequentially sent from the control section 111 to the processing section 124 is included in the operation state history information, after sending the second instruction to the processing section 124, the control section 111 executes the error avoiding operation before sending the first instruction to the processing section 124.

Therefore, in the image processing apparatus 11, it is possible to prevent occurrence of an error by executing, with the second instruction as an opportunity, the error avoiding operation before sending the first instruction to the processing section 124.

As a configuration example, in the image processing apparatus 11, the control section 111 includes a predetermined number of instructions in the instruction history information in the beginning and, thereafter, adjusts the number of instructions to be included in the instruction history information.

Therefore, in the image processing apparatus 11, by adjusting the number of instructions for determining execution of the error avoiding operation, it is possible to improve accuracy of the condition for executing the error avoiding operation.

As a configuration example, in the image processing apparatus 11, the control section 111 adjusts, based on the instruction history information and the operation state history information, according to a situation at the time when an error occurs, the number of instructions to be included in the instruction history information.

Therefore, in the image processing apparatus 11, by adjusting, according to a situation at the time when an error occurs, the number of instructions for determining execution of the error avoiding operation, it is possible to improve accuracy of the condition for executing the error avoiding operation.

As a configuration example, in the image processing apparatus 11, the situation at the time when an error occurs includes a result of the execution of the error avoiding operation.

Therefore, in the image processing apparatus 11, by adjusting the number of instructions for determining execution of the error avoiding operation according to a result of the execution of the error avoiding operation, it is possible to improve accuracy of the condition for executing the error avoiding operation.

As a configuration example, in the image processing apparatus 11, the situation at the time when an error occurs includes a combination of instructions at the time when the error occurs. The control section 111 adjusts, based on the numbers of instructions included combinations of instructions at the time when a plurality of errors respectively occur, the number of instructions to be included in the instruction history information to a maximum value of the numbers of instructions.

Therefore, in the image processing apparatus 11, by adjusting the number of instructions for determining execution of the error avoiding operation according to the combination of instructions at the time when an error occurs, it is possible to set the number of instructions common to all errors.

As a configuration example, in the image processing apparatus 11, the control section 111 adjusts, based on the number of instructions generated in a predetermined time, the number of instructions to be included in the instruction history information.

Therefore, in the image processing apparatus 11, it is possible to adjust the number of instructions for determining execution of the error avoiding operation to a number suitable for the number of instructions generated in the predetermined time.

As a configuration example, in the image processing apparatus 11, the control section 111 selects an error avoiding operation to be executed among a plurality of error avoiding operations and sends an instruction corresponding to the selected error avoiding operation to the processing section.

Therefore, in the image processing apparatus 11, it is possible to select and execute a suitable error avoiding operation among the plurality of error avoiding operations.

As a configuration example, in the image processing apparatus 11, the control section 111 selects, according to a type of an error, an error avoiding operation to be executed among a plurality of error avoiding operations.

Therefore, in the image processing apparatus 11, it is possible to select and execute an error avoiding operation suitable for the type of the error among the plurality of error avoiding operations.

As a configuration example, in the image processing apparatus 11, the plurality of error avoiding operations include an error avoiding operation for performing standby for a predetermined time.

Therefore, in the image processing apparatus 11, it is possible to attempt avoidance of an error by executing the error avoiding operation for performing standby for the predetermined time.

As a configuration example, in the image processing apparatus 11, the plurality of error avoiding operations include an error avoiding operation for performing suspension and resumption of a job.

Therefore, in the image processing apparatus 11, it is possible to attempt avoidance of an error by executing the error avoiding operation for performing suspension and resumption of a job.

As a configuration example, in the image processing apparatus 11, the plurality of error avoiding operations include an error avoiding operation for performing transition of a screen.

Therefore, in the image processing apparatus 11, it is possible to attempt avoidance of an error by executing the error avoiding operation for performing transition of a screen.

As a configuration example, in the image processing apparatus 11, the plurality of error avoiding operations include an error avoiding operation for performing a reboot of a predetermined section.

Therefore, in the image processing apparatus 11, it is possible to attempt avoidance of an error by executing the error avoiding operation for performing a reboot of a predetermined section.

As a configuration example, the image processing apparatus 11 includes the storing section 122 that stores instruction history information and operation state history information.

Therefore, in the image processing apparatus 11, it is possible to execute the error avoiding operation based on the instruction history information and the operation state history information stored in the image processing apparatus 11.

As a configuration example, in the image processing apparatus 11, a storing section that stores instruction history information and operation state history information is provided in an external apparatus.

Therefore, in the image processing apparatus 11, it is possible to execute the error avoiding operation based on the instruction history information and the operation state history information stored in the external storing section.

As an example, the external apparatus is the server apparatus 13. In this embodiment, the storing section provided in the external apparatus is the server storage section 31.

For example, a method of control performed in the image processing apparatus 11 may be provided.

As a configuration example, the control method for the image processing apparatus 11 is a control method for the image processing apparatus 11 including the processing section 124 and the control section 111 that instructs the operation of the processing section 124. The control method performs the following control.

In the control method, the control section 111 executes, before sending, to the processing section 124, a first instruction corresponding to an instruction that caused an error in the past, an error avoiding operation based on instruction history information and operation state history information acquired from a storing section that stores the instruction history information and the operation state history information. The instruction history information indicates an instruction given to the processing section 124 by the control section 111 and the operation state history information indicates an operation state of the processing section 124 caused by the instruction.

Therefore, in the control method for the image processing apparatus 11, it is possible to prevent occurrence of an error.

A program for realizing a function of any constituent section in any apparatus such as the image processing apparatus 11, the host computer 12, or the server apparatus 13 explained above may be recorded in a computer-readable recording medium. The program may be read and executed by a computer system. The "computer system" includes an operating system or hardware such as peripheral devices. The "computer-readable recording medium" means a portable medium such as a flexible disk, a magneto-optical disk, a ROM, or a CD (Compact Disc)-ROM or a storage device such as a hard disk incorporated in the computer system. Further, the "computer-readable recording medium" includes a recording medium retaining a program for a fixed time like a volatile memory inside the computer system functioning as a server or a client when the program is transmitted via a network such as the Internet or a communication line such as a telephone line. The volatile memory maybe, for example, a RAM. The recording medium may be, for example, a non-transitory recording medium.

The program may be transmitted from the computer system, in which the program is stored in the storage device or the like, to another computer system via a transmission medium or by a transmission wave in the transmission medium. The "transmission medium" for transmitting the program means a medium having a function of transmitting information like a network such as the Internet or a communication line such as a telephone line.

The program may be a program for realizing a part of the functions explained above. Further, the program may be a program that can realize the functions explained above in a combination with a program already recorded in the computer system, a so-called differential file. The differential file may be called differential program.

A function of any constituent section in any apparatus such as the image processing apparatus 11, the host computer 12, or the server apparatus 13 explained above may be realized by a processor. For example, the kinds of processing in the embodiment may be realized by a processor that operates based on information such as program and a computer-readable recording medium that stores the information such as the program. For example, functions of sections of the processor may be realized by individual hardware or may be realized by integral hardware. For example, the processor may include hardware. The hardware may include at least one of a circuit that processes a digital signal and a circuit that processes an analog signal. For example, the processor may be configured using one or both of one or a plurality of circuit devices mounted on a circuit board or one or a plurality of circuit elements. As the circuit device, an IC (Integrated Circuit) or the like may be used. As the circuit element, a resistor, a capacitor, or the like may be used.

The processor may be, for example, a CPU. However, the processor is not limited to the CPU. Various processors such as a GPU (Graphics Processing Unit) and a DSP (Digital Signal Processor) may be used. The processor may be, for example, a hardware circuit by an ASIC (Application Specific Integrated Circuit). For example, the processor may be configured by a plurality of CPUs or may be configured by a hardware circuit by a plurality of ASICs. The processor may be configured by, for example, a combination of the plurality of CPUs and the hardware circuit by the plurality of ASICs. The processor may include, for example, one or more of an amplifier circuit, a filter circuit, and the like that process an analog signal.

The embodiment of the present disclosure is explained in detail above with reference to the drawings. However, a specific configuration is not limited to the embodiment and includes design and the like in a range not departing from the gist of the present disclosure.

What is claimed is:

1. An image processing apparatus comprising:
a processing section; and
a central processing unit (CPU) configured to:
  instruct operation of the processing section; and
  execute, before sending, to the processing section, a first instruction corresponding to an instruction that caused an error in past, an error avoidance operation based on instruction history information and operation state history information acquired from a memory that stores the instruction history information and the operation state history information, wherein
    the instruction history information indicating an instruction given to the processing section by the CPU,
    the operation state history information indicating an operation state of the processing section caused by the instruction given to the processing section by the CPU, and
    when an instruction corresponding to a second instruction and the instruction corresponding to the first instruction sequentially sent from the CPU to the processing section are included in the instruction history information and information indicating that an error occurs when the instruction corresponding to the second instruction and the instruction corresponding to the first instruction are sequentially sent is included in the operation state history information, after sending the second instruction to the processing section, the CPU is further configured to execute the error avoiding operation before sending the first instruction to the processing section.

2. The image processing apparatus according to claim 1, wherein the CPU is further configured to:
  select the error avoiding operation to be executed among a plurality of error avoiding operations; and
  send an instruction corresponding to the selected error avoiding operation to the processing section.

3. The image processing apparatus according to claim 2, wherein the CPU is further configured to select, according to a type of the error, the error avoiding operation to be executed among the plurality of the error avoiding operations.

4. The image processing apparatus according to claim 2, wherein the plurality of error avoiding operations includes the error avoiding operation for performing standby for a predetermined time.

5. The image processing apparatus according to claim 2, wherein the plurality of error avoiding operations includes the error avoiding operation for performing suspension and resumption of a job.

6. The image processing apparatus according to claim 2, wherein the plurality of error avoiding operations includes the error avoiding operation for performing transition of a screen or the error avoiding operation for performing a reboot of a predetermined section.

7. The image processing apparatus according to claim 1, wherein the image processing apparatus further comprising the memory.

8. The image processing apparatus according to claim 1, wherein the memory is provided in an external apparatus.

9. An image processing apparatus comprising:
a processing section; and
a central processing unit (CPU) configured to:
  instruct operation of the processing section;
  execute, before sending, to the processing section, a first instruction corresponding to an instruction that caused an error in past, an error avoidance operation based on instruction history information and operation state history information acquired from a memory that stores the instruction history information and the operation state history information, wherein
    the instruction history information indicating an instruction given to the processing section by the CPU, and
    the operation state history information indicating an operation state of the processing section caused by the instruction given to the processing section by the CPU, and
  control a predetermined number of instructions in the instruction history information in a beginning, and thereafter adjust a number of instructions to be included in the instruction history information.

10. The image processing apparatus according to claim 9, wherein the CPU is further configured to adjust, based on the instruction history information and the operation state history information, according to a situation at a time when an error occurs, the number of instructions to be included in the instruction history information.

11. The image processing apparatus according to claim 10, wherein the situation at the time when the error occurs includes a result of the execution of the error avoiding operation.

12. The image processing apparatus according to claim 10, wherein
the situation at the time when the error occurs includes a combination of the instructions at the time when the error occurs, and
the CPU is further configured to adjust, based on number of the instructions included in combinations of the instructions at a time when a plurality of errors respectively occur, the number of instructions to be included in the instruction history information to a maximum value of the number of the instructions.

13. The image processing apparatus according to claim 9, wherein the CPU is further configured to adjust, based on a number of instructions generated in a predetermined time, the number of instructions to be included in the instruction history information.

14. A control method for an image processing apparatus including a processing section and a CPU configured to instruct operation of the processing section, the method comprising:
causing the CPU to execute, before sending, to the processing section, a first instruction corresponding to an instruction that caused an error in past, an error avoidance operation based on instruction history information and operation state history information acquired from a memory that stores the instruction history information and the operation state history information, wherein
the instruction history information indicating an instruction given to the processing section by the CPU, and
the operation state history information indicating an operation state of the processing section caused by the instruction given to the processing section by the CPU, and
causing the CPU to execute the error avoiding operation before sending the first instruction to the processing section and after sending a second instruction to the processing section, when an instruction corresponding to the second instruction and the instruction corresponding to the first instruction sequentially sent from the CPU to the processing section are included in the instruction history information and information indicating that an error occurs when the instruction corresponding to the second instruction and the instruction corresponding to the first instruction are sequentially sent is included in the operation state history information.

* * * * *